US008890499B2

(12) United States Patent
Swanson et al.

(10) Patent No.: US 8,890,499 B2
(45) Date of Patent: Nov. 18, 2014

(54) BUCK DC-DC CONVERTER WITH IMPROVED ACCURACY

(71) Applicant: Micrel, Inc., San Jose, CA (US)

(72) Inventors: Leland Swanson, Leander, TX (US); Dashun Xue, Austin, TX (US); William MacLean, Austin, TX (US)

(73) Assignee: Micrel, Inc., San Jose, CA (US)

( * ) Notice: Subject to any disclaimer, the term of this patent is extended or adjusted under 35 U.S.C. 154(b) by 122 days.

(21) Appl. No.: 13/793,953

(22) Filed: Mar. 11, 2013

(65) Prior Publication Data
US 2014/0253082 A1 Sep. 11, 2014

(51) Int. Cl.
*G05F 1/565* (2006.01)
*H02M 3/156* (2006.01)

(52) U.S. Cl.
CPC ..................................... *H02M 3/156* (2013.01)
USPC .......................................................... 323/275

(58) Field of Classification Search
USPC .......... 323/234, 237, 265, 273–275, 282–285
See application file for complete search history.

(56) References Cited

U.S. PATENT DOCUMENTS

| 6,628,109 | B2 | 9/2003 | Rincon-Mora |
| 7,439,721 | B2 | 10/2008 | Weng et al. |
| 7,482,791 | B2 * | 1/2009 | Stoichita et al. ............... 323/271 |
| 7,482,793 | B2 | 1/2009 | Stoichita |
| 2005/0017703 | A1 * | 1/2005 | Walters et al. ................. 323/288 |
| 2010/0019749 | A1 * | 1/2010 | Katsuya et al. ................ 323/282 |
| 2010/0283441 | A1 * | 11/2010 | Wang et al. .................... 323/282 |
| 2012/0274301 | A1 * | 11/2012 | Nakashima .................... 323/284 |

* cited by examiner

*Primary Examiner* — Adolf Berhane
*Assistant Examiner* — Jeffrey Gblende
(74) *Attorney, Agent, or Firm* — Van Pelt, Yi & James LLP (57) ABSTRACT

A buck switching regulator includes a feedback control circuit including a feedback network including first and second gain circuits configured to generate first and second feedback signals, respectively, indicative of the regulated output voltage; a ripple generation circuit configured to inject a ripple signal to the first gain circuit; an operational transconductance amplifier (OTA) configured to receive the second feedback signal and a reference signal and to generate an output signal being coupled to the first gain circuit to adjust the first feedback signal; and a comparator configured to receive the first feedback signal and the reference signal and to generate a comparator output signal. The output signal of the OTA is applied to the first feedback signal to cancel a voltage offset in the regulated output voltage due to the injected ripple signal to the first gain circuit.

20 Claims, 6 Drawing Sheets

BUCK DC-DC CONVERTER WITH IMPROVED ACCURACY

BACKGROUND OF THE INVENTION

The invention relates to switching regulators and, in particular, to buck DC-DC converters with enhanced accuracy and improved stability.

Switch mode power supplies or switching regulators, also referred to as DC to DC converters, are often used to convert an input supply voltage to a desired output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional buck switching regulator is well known and is generalized as follows. A conventional buck switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

More specifically, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

Figure 1:
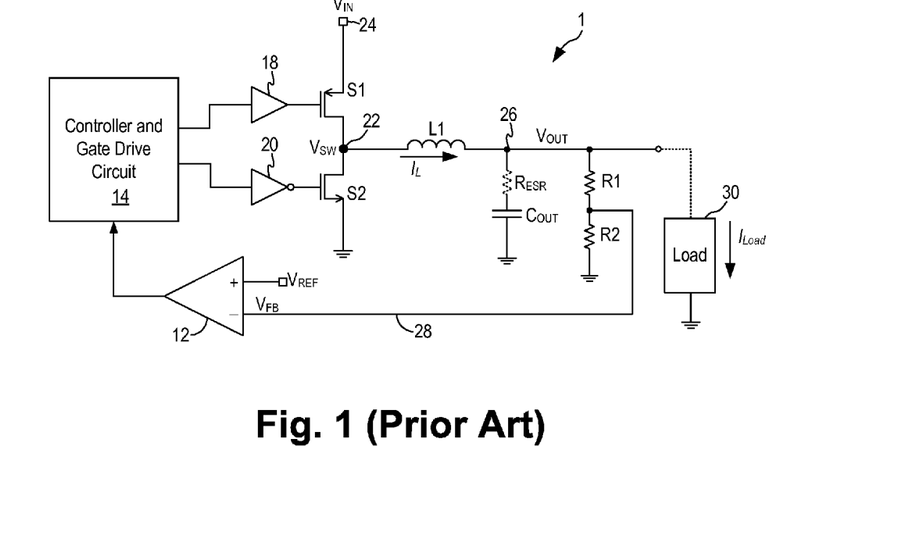
FIG. 1 is a schematic diagram of a conventional buck switching regulator.

FIG. 1 is a schematic diagram of a conventional buck switching regulator. Referring to FIG. 1, a switching regulator 1 includes a pair of power switches S1 and S2 configured to receive an input voltage $V_{IN}$ and are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator 1 as a feedback voltage $V_{FB}$ on a feedback node 28. The feedback voltage $V_{FB}$ is compared with the reference voltage $V_{REF}$ at an error comparator 12. The comparator output is coupled to a controller and gate drive circuit 14 to generate control voltages for the power switches based on a switching regulator control scheme. The control voltages are used to generate gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches.

Buck switching regulators or "buck regulators" with fixed on-time control are preferred in the industry for some important advantages as good efficiency for light load in PFM (pulse frequency modulation) mode, easy synchronization with external signals, easy control of a relatively large off-time and a very small fixed on-time to regulate a high input voltage to a low output voltage. Fixed on-time (or constant on-time) regulators are one type of voltage regulators employing ripple-mode control where the output voltage is regulated based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitors placed in parallel with the load. The ESR of the output capacitor $C_{OUT}$ is denoted as a resistor $R_{ESR}$ in FIG. 1. Recently, low ESR capacitors are preferred to realize improved efficiency in switching regulators but the low ESR capacitors do not generate enough output ripple for feedback control. In that case, a ripple injection circuit (not shown in FIG. 1) is used to introduce the ripple signal used in the feedback loop. U.S. Pat. Nos. 7,482,791 and 7,482,793 illustrate examples of ripple injection circuits that can be applied in buck regulators using fixed on-time control.

Figure 2:
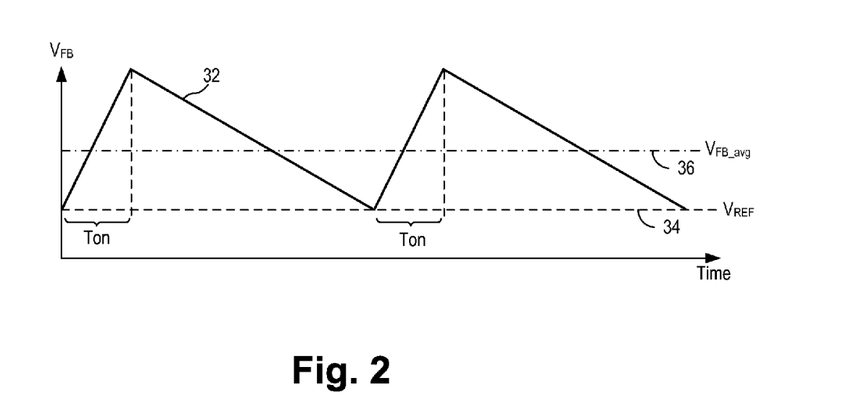
FIG. 2 is a voltage waveform illustrating the output voltage ripple on the feedback voltage $V_{FB}$ of a constant on-time voltage regulator.

FIG. 2 is a voltage waveform illustrating the output voltage ripple on the feedback voltage $V_{FB}$ of a constant on-time voltage regulator. In operation, a constant on-time (or fixed on-time) regulator switches the output inductor high for a fixed on-time (Ton) when the output ripple falls below a single reference point $V_{REF}$. At the end of the fixed on-time, even if the output ripple may still be below the single reference point, the output inductor is switched low for a minimum off-time before getting switched back high for the fixed on-time again. In the feedback control loop, the output voltage ripple on the feedback voltage $V_{FB}$ is regulated so that the valley of the voltage ripple essentially sits at the reference voltage level ($V_{REF}$), as shown in FIG. 2. The voltage ripple at the feedback node 28 increases for the fixed on-time (Ton) when the high-side power switch is turned on and the voltage ripple at feedback node 28 decreases when the high-side power switch is turned off, and the low side switch is turned on, until the feedback voltage $V_{FB}$ reaches the reference voltage $V_{REF}$.

For voltage regulators using ripple-mode control, while the output ripple is useful in output voltage regulation, it is undesirable because the output ripple introduces an offset to the output voltage, reducing the output signal accuracy. In particular, the average DC voltage (the mid-point) of the ripple voltage signal should be equal to the comparator reference voltage $V_{REF}$. However, as shown in FIG. 2, when the feedback voltage includes a ripple voltage component, the average DC voltage (line 36) of the feedback signal $V_{FB}$ is offset from the reference voltage $V_{REF}$ (line 34) since the comparator, which is referenced to the reference voltage $V_{REF}$, is initiating an on-time when the ripple falls below Vref. Hence, it is the lower apex of the triangular waveform that is being regulated, not the average of the triangular waveform. As a result, output voltage $V_{OUT}$ has a DC offset voltage component which affects the accuracy of the buck regulator. For example, the offset at the feedback voltage may be about 10 mV but the offset is gained up through the control circuit and the power switches, due to the presence of the resistor divider (R1/R2), so that the output voltage may experience an offset voltage of 30-50 mV which is unacceptable in most applications. Also, the ripple amplitude will be dependent on load current and the converter input voltage, thus degrading load regulation and PSRR performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a buck switching regulator incorporates an accuracy enhanced feedback network to regulate the output voltage to a substantially constant level without voltage offset and with improved output voltage accuracy. In some embodiments, the accuracy enhanced feedback network includes a feedback circuit providing a first feedback signal with injected ripple to regulate the output voltage to the desired voltage level. Meanwhile, a second feedback signal is generated using a replicated feedback circuit and the second feedback signal is applied as a perturbation to the feedback network to push the voltage level of the first feedback voltage higher so as to eliminate the offset resulted from the ripple signal.

In other embodiments of the present invention, a buck switching regulator includes a feedback control loop incorporating a balanced feedback network to regulate the output voltage to a substantially constant level without voltage offset and with improved stability. In some embodiments, the balanced feedback network provides a first feedback signal with injected ripple to regulate the output voltage to the desired voltage level. Meanwhile, a second feedback signal, also with injected ripple, is used to generate an error signal, $V_{ERR}$, that can be applied to a node in the feedback network to correct for the offset resulted from the ripple signal in the first feedback signal path and to improve the stability of the feedback control loop.

Figure 3:
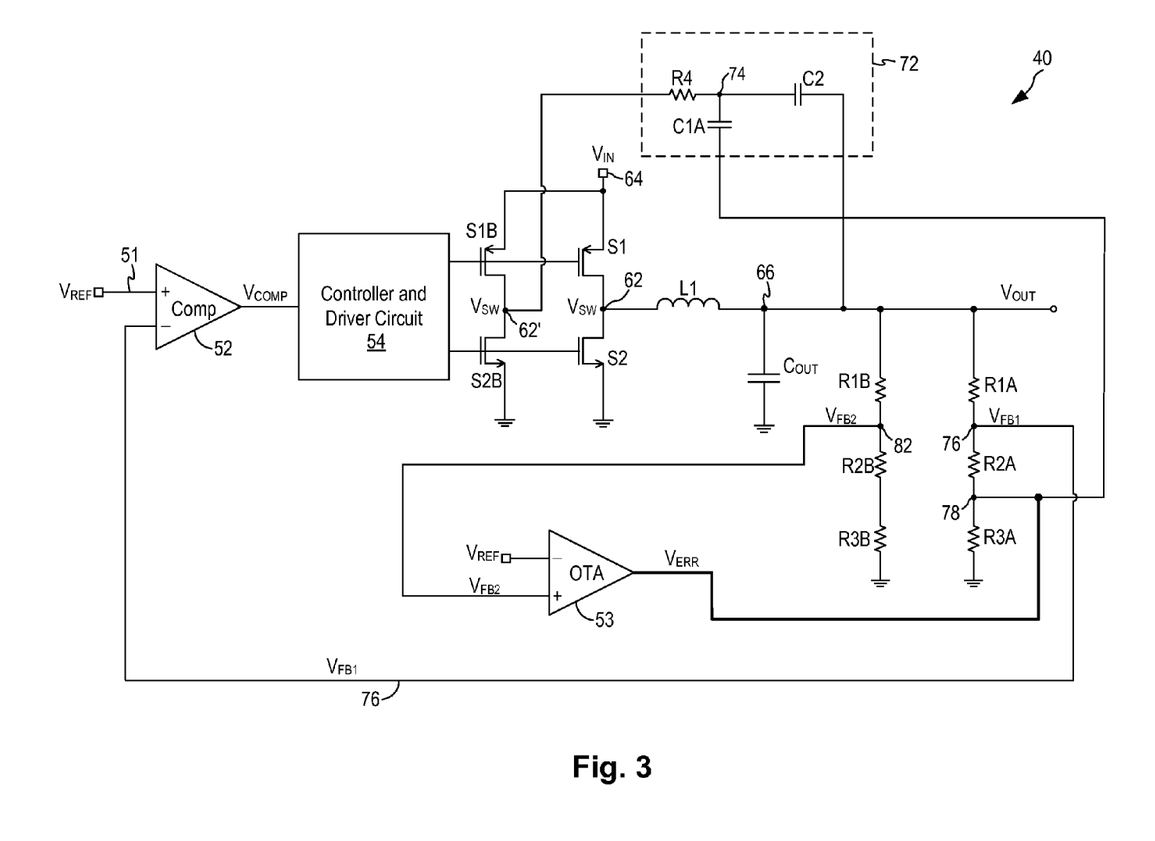
FIG. 3 is a schematic diagram of a buck switching regulator incorporating an accuracy enhanced feedback network in embodiments of the present invention.

FIG. 3 is a schematic diagram of a buck switching regulator incorporating an accuracy enhanced feedback network in embodiments of the present invention. Referring to FIG. 3, a switching regulator 40 includes a pair of power switches S1 and S2 connected in series between an input voltage $V_{IN}$ (node 64) and a ground potential. Power switches S1 and S2 are alternately turned on and off to generate a switching output voltage $V_{SW}$ at a switch node 62. The switching output voltage $V_{SW}$ is directly coupled to an LC filter circuit including an output inductor L1 and an output capacitor $C_{OUT}$ to generate a regulated output voltage $V_{OUT}$ at a node 66 having a substantially constant magnitude. The output voltage $V_{OUT}$ can then be used to drive a load whereby switching regulator 40 provides a load current $I_{LOAD}$ to maintain the output voltage $V_{OUT}$ at a constant level.

Switching regulator 40 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In embodiments of the present invention, the switching regulator 40 implements a constant on-time (or fixed on-time), variable off-time feedback control scheme. A controller and driver circuit 54 generates the gate drive voltages for controlling the power switches S1 and S2 based on the constant on-time control scheme. Under the constant on-time control scheme, the controller and driver circuit 54 turns on the high-side power switch S1 for a fixed on-time (Ton) when a feedback signal $V_{FB1}$ falls below a reference voltage $V_{REF}$. At the end of the fixed on-time, even if the feedback signal is still below the reference point, the high-side power switch S1 is turned off for at least a minimum off-time before being switched back high for the fixed on-time again. Thus, the inductor current and the output voltage increase for the fixed on-time (Ton) when the high-side power switch is turned on; meanwhile, the inductor current and the output voltage decreases when the high-side power switch S1 is turned off until the feedback signal $V_{FB1}$ reaches the reference point $V_{REF}$.

To implement constant on-time control, the feedback control circuit relies on the ripple components in the feedback signal to assist in the regulation the output voltage. In some examples, an output voltage ripple is generated by using an output capacitor $C_{OUT}$ having a sufficiently large equivalent series resistance (ESR). However, capacitors with large ESR are generally more costly and also introduce ripples to the output voltage $V_{OUT}$ itself. In embodiments of the present invention, the output capacitor $C_{OUT}$ is implemented using a capacitor with very low or near zero ESR so that output voltage ripple and output voltage variation at the output voltage $V_{OUT}$ is minimized. Instead, a ripple generation circuit 72 is used to generate an internal ripple signal which is injected into the feedback control loop of the switching regulator 40. In the present embodiment, the ripple generation circuit 72 generates a ripple voltage signal using the switching output voltage $V_{SW}$.

Furthermore, in the present embodiment, the ripple generation circuit 72 uses the switching output voltage $V_{SW}$ generated by a pair of mirrored power switches S1B and S2B. Power switches S1B and S2B are connected in parallel with power switches S1 and S2 and generates a mirrored version of the switching output voltage $V_{SW}$ at a node 62'. The ripple generation circuit 72 connects to the switching output voltage $V_{SW}$ at the node 62' while the switching output voltage $V_{SW}$ at node 62 drives the output inductor L1. In the present embodiment, the ripple generation circuit is implemented using a resistor R4 and a capacitor C2 connected in series across the inductor L1, that is between nodes 62' and 66. A capacitor C1A is connected to the common node 74 between resistor R4 and capacitor C2 and also to a node 78 in the feedback network. The resistor R4, capacitors C1A and C2 operate to inject a ripple signal into the feedback signal $V_{FB1}$ of the feedback control loop in switching regulator 40.

It is instructive to note that the ripple generation circuit 72 in FIG. 3 is a symbolic or simplified representation of an actual ripple generation circuit. One of ordinary skill in the art will appreciate that a ripple generation circuit or a ripple injection circuit in actual implementation may be more complicated than shown in FIG. 3. Examples of ripple injection circuits that can be applied in the buck switching regulators of the present invention are described in U.S. Pat. Nos. 7,482,791 and 7,482,793, which patents are incorporated herein by reference in their entireties.

In embodiments of the present invention, the feedback control circuit of the switching regulator 40 uses an accuracy enhanced feedback network to generate a pair of feedback signals $V_{FB1}$ and $V_{FB2}$. The feedback signal $V_{FB1}$ is used to regulate the output voltage $V_{OUT}$ while the feedback signal $V_{FB2}$ is used to correct for the DC offset in the output voltage $V_{OUT}$ due to the ripple signal in the feedback signal $V_{FB1}$. In the present embodiment, the feedback network is formed by a pair of similarly constructed gain circuits connected in parallel between the output voltage $V_{OUT}$ (node 66) and the ground potential. More specifically, the feedback network includes first and second gain circuits implemented as voltage dividers.

The first gain circuit is formed by resistors R1A, R2A and R3A connected in series between the output voltage node 66 and the ground potential. The bottom plate of capacitor C1A of the ripple generation circuit 72 is connected to the common node 78 between resistors R2A and R3A to inject the ripple signal to the feedback network. As thus configured, the first feedback voltage signal $V_{FB1}$ is generated at the common node 76 between resistors R1A and R2A. The first feedback voltage signal $V_{FB1}$ includes a DC voltage component proportional to the output voltage $V_{OUT}$ and the injected ripple signal. The first feedback voltage $V_{FB1}$ is provided as a first input signal to a comparator 52. The comparator 52 also receives a reference voltage $V_{REF}$ (node 51) as a second input signal. The comparator 52 compares the first feedback voltage signal $V_{FB1}$ with the reference voltage $V_{REF}$ to generate a comparator output signal $V_{COMP}$. The comparator output signal $V_{COMP}$ is coupled to the controller and driver circuit 54 to generate the driver signals for the power switches S1 and S2 as well as power switches S1B and S2B in accordance with a constant on-time control scheme.

Because the first feedback voltage $V_{FB1}$ includes ripple signal components, the average feedback voltage does not equal the reference voltage $V_{REF}$ so that the output voltage $V_{OUT}$ has an undesirable voltage offset. In switching regulator 40, the second feedback voltage signal $V_{FB2}$ is used to eliminate this undesirable offset. To that end, the feedback control loop includes the second gain circuit which is a replicate of the first gain circuit for generating the first feedback voltage signal $V_{FB1}$. In particular, the second gain circuit is formed by resistors R1B, R2B and R3B connected in series between the output voltage node 66 and the ground potential. The second feedback voltage signal $V_{FB2}$ is generated at the common node 82 between resistors R1B and R2B.

The signal at $V_{FB1}$ is held within a constrained level of voltages, since it is the sum of $V_{REF}$ plus the injected ripple voltage. The comparator will not allow the voltage at $V_{FB1}$ to fall below $V_{REF}$, and the upper level is approximately $V_{REF}$ plus the maximum of the injected ripple, which varies slightly with load, duty cycle, etc. A load step on the output, $V_{OUT}$, will initiate an output undershoot or overshoot, with a time constant that is function of the output filter (L1 and $C_{OUT}$) time constant. The second feedback signal $V_{FB2}$ will then include voltage components proportional to the output voltage $V_{OUT}$.

The second feedback voltage $V_{FB2}$ is coupled to an operational transconductance amplifier (OTA) 53 which also receives the reference voltage $V_{REF}$. OTA 53 senses the difference between the reference voltage $V_{REF}$ and the second feedback voltage signal $V_{FB2}$ and generates an error signal $V_{ERR}$ which is coupled to drive a node 78 between the resistors R2A and R3A of the first gain circuit. In operation, because the bandwidth of the OTA 53 is low, the OTA 53 generates the error signal $V_{ERR}$ that is an average of the second feedback voltage $V_{FB2}$. The error signal $V_{ERR}$ is used to drive the voltage divider of the first gain circuit to push up the voltage level of the first feedback voltage signal $V_{FB1}$. When the first feedback voltage signal $V_{FB1}$ is pushed artificially higher, the feedback control loop including OTA 53 will operate to regulate the output voltage $V_{OUT}$ lower so that the offset in the output voltage is eliminated. In other words, the second feedback voltage signal $V_{FB2}$ is used to inject an inverse offset to cancel out the undesirable offset in the output voltage $V_{OUT}$ created by the error comparator loop.

In summary, the accuracy enhanced feedback network in switching regulator 40 replicates the resistor portion of the gain circuit for generating the feedback voltage signal $V_{FB1}$ to generate a second feedback voltage signal $V_{FB2}$. The second feedback voltage signal $V_{FB2}$ senses the true output voltage without any ripple injection. The OTA 53 senses the DC error level of the output voltage and generates the error signal to bias the first gain circuit to shift the first feedback voltage signal up. In some embodiments, the OTA 53 is only capable of sourcing 2-4 µA at the output. Thus, the error signal from the OTA 53 introduces only a small perturbation to the feedback control loop. The error signal has the effect of shifting up the feedback signal to the comparator 52 to force the comparator to control the output voltage $V_{OUT}$ to a lower voltage, thereby correcting for the voltage offset. Furthermore, because the OTA 53 only applies a small perturbation in the feedback control loop, any malfunction at the OTA would not appreciably affect circuit functionality. The switching regulator 40 can continue to operate with offset error if OTA 53 malfunctions or is intentionally disabled.

In the above-described embodiment, the feedback circuit in switching regulator 40 corrects for the voltage offset resulting from the injected ripple signal in the feedback signal. However, the use of the OTA 53 in the feedback control loop introduces a third pole to the frequency response of the feedback control loop, in addition to the two poles from the output LC filter circuit of inductor L1 and capacitor $C_{OUT}$. For loop stability concern, it is necessary for the pole of the OTA to be far apart from the poles of the output filter circuit. While it is possible to select an output filter circuit with poles at sufficiently high frequency to avoid collision with the pole from the OTA, it is often undesirable to limit the choices of the inductor and capacitor values of the output filter circuit that would otherwise enable adjustment and tradeoff of converter performance, such as load regulation and transient response.

According to embodiments of the present invention, a balanced feedback network is implemented where an injected ripple signal is applied to both the first feedback circuit configured to regulate the output voltage and to the second feedback circuit configured to correct the output voltage accuracy. As thus configured, the poles of the LC filter circuit are significantly decoupled from the pole of the OTA so that constraints on the element values of the LC filter circuit can be removed. The use of the balanced feedback network in a switching regulator allows the use of a wide range of output inductor and output capacitor values and the selection of low pole frequency values in the output LC filter. Furthermore, the use of a balanced feedback network improves the stability of the feedback control loop.

Figure 4:
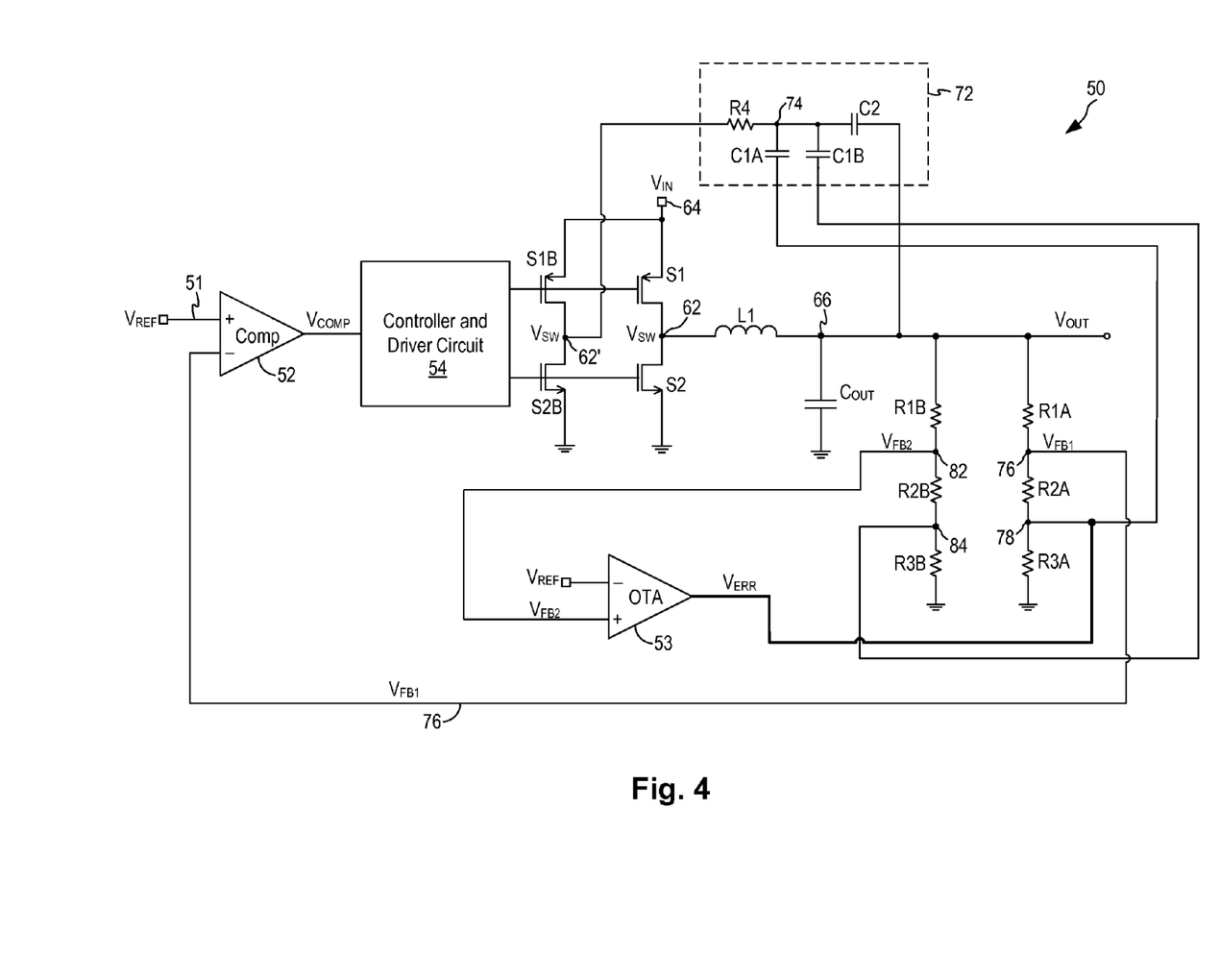
FIG. 4 is a schematic diagram illustrating an embodiment of a buck switching regulator incorporating a balanced feedback network in the feedback control loop.

FIG. 4 is a schematic diagram illustrating an embodiment of a buck switching regulator incorporating a balanced feedback network in the feedback control loop. Referring to FIG. 4, a switching regulator 50 is implemented in a similar manner as the switching regulator 40 in FIG. 3. Like elements in FIGS. 3 and 4 are given like reference numerals and will not be further described. Switching regulator 50 includes a balanced feedback network for generating the first and second feedback voltage signals $V_{FB1}$ and $V_{FB2}$. The balanced feedback network is constructed by replicating the gain circuit that generates the first feedback signal $V_{FB1}$ for regulating the output voltage, including replicating the ripple injection.

More specifically, the ripple generation circuit 72 in the switching regulator 50 includes a capacitor C1B which mirrors the capacitor C1A. A mirrored ripple signal is generated at the lower plate of capacitor C1B and the mirrored ripple signal is injected into the second gain circuit used to generate the second feedback voltage signal $V_{FB2}$. That is, the bottom plate of capacitor C1B is connected to a node 84 between the resistor R2B and resistor R3B to inject a second ripple signal to the second gain circuit. In this manner, the same ripple signal injected into the first feedback voltage signal $V_{FB1}$ at node 78 is also injected into the second feedback voltage signal $V_{FB2}$ at node 84. When the ripple signal is injected into both feedback circuits, stability of the feedback control loop is greatly improved. However, it is instructive to note that the mirrored ripple signal is injected into the feedback circuits but not through the OTA feedback loop due to the low speed of the OTA response. Therefore, the injected ripple signal into the second feedback circuit improves stability but does not affect the accuracy of the offset correction provided by the OTA feedback loop.

In other words, because the error signal $V_{ERR}$ does not include any ripple components and has greatly attenuated transient voltages, the OTA feedback loop contains minimal phase shift which may affect the accuracy of the offset correction. Another way to state this is that the double pole of the output filter is now decoupled from the pole in the OTA. It is no longer as important to set the unity gain bandwidth (UGBW) of the OTA to be at least two to five times less that of the output filter poles. Thus a system level constraint on the lower bound of the output poles of the filter for a given particular OTA design has been nearly removed. The inductance and capacitance values for the output filter can be selected without being constrained by the pole, or UGBW, of the OTA in the switching regulator.

In embodiments of the present invention, the mirror ripple signal generated for the second gain circuit has ripple magnitude and phase that are closely matched to the ripple signal generated for the first gain circuit, within resistance and capacitance tolerances. The amplitude of the mirrored ripple signal scales with the gains of the first and second gain circuits if the two gain circuits have different gain.

In operation, the signal at $V_{FB1}$ is held within a constrained level of voltages, since it is the sum of $V_{REF}$ plus the injected ripple voltage. The comparator will not allow the voltage at $V_{FB1}$ to fall below $V_{REF}$, and the upper level is approximately $V_{REF}$ plus the maximum of the injected ripple, which varies slightly with load, duty cycle, etc. Since the second feedback signal $V_{FB2}$ is a mirror copy of the signal $V_{FB1}$, minus a DC level shift, the level of feedback signal $V_{FB2}$ is also nearly constant within the same constraints as $V_{FB1}$. Hence, load transients only slightly perturb the average value at signal $V_{FB2}$, and the minimum of signal $V_{FB2}$ is essentially always constant except during transient conditions. The average only varies as the average ripple injection varies.

In embodiments of the present invention, resistors R1A/R2A/R3A and resistors R1B/R2B/R3B form a balanced feedback network to generate the feedback signals for regulating the output voltage $V_{OUT}$ of the switching regulator and for adjusting the accuracy of the output voltage. The stability of the feedback control loop is improved by using a balanced feedback network where the ripple signal is injected into both feedback resistor networks (i.e., the first and second gain circuits) generating the first and second feedback signal. In this manner, greater choices for the inductor and capacitor values for the output filter circuit L1 and $C_{OUT}$ can be realized.

In some embodiments, resistors R1A/R2A/R3A and resistors R1B/R2B/R3B have the same resistance values. In other embodiments, the resistance values of resistors R1B/R2B/R3B have matching values to resistors R1A/R2A/R3A but are not necessarily the same resistance values. In this latter embodiment, the capacitors C1A and C1B must be scaled appropriately.

In the above described embodiments, with the balanced feedback network thus formed, the OTA 53 injects the error signal $V_{ERR}$ to the first gain circuit (node 78). In other embodiments of the present invention, the error signal generated by the OTA 53 can be injected in another point or node in the feedback control loop to realize offset correction to improve the accuracy of the output voltage $V_{OUT}$. The particular location of where the error signal $V_{ERR}$ is injected is not critical to the practice of the present invention as long as the error signal $V_{ERR}$ is applied to a point in the switching regulator feedback control loop.

For instance, in the above described embodiments, with the balanced feedback network thus formed, the OTA 53 injects the error signal $V_{ERR}$ to the first gain circuit at a node (78) below the feedback node (76) where the first feedback voltage signal is taken. That is, the OTA 53 injects the error signal $V_{ERR}$ to the first gain circuit at a node (78) that is closer to the ground potential than the feedback node (76) where the first feedback voltage signal is taken. In other embodiments of the present invention, the OTA 53 injects the error signal $V_{ERR}$ to the first gain circuit at the feedback node or at a node closer to the ground potential than the feedback node. That is, the resistance of resistors R2A can be zero in some embodiments. However, better performance is obtained when the error signal is injected at a node closer to ground than the feedback node. In one embodiment, the resistance value of resistor R3A is less than the resistance value of resistor R2A.

Furthermore, it is instructive to note that the error signal $V_{ERR}$ does not have to be injected at the same node where the ripple injection is applied. FIG. 4 illustrates one embodiment where the error signal $V_{ERR}$ is injected at the same node as the ripple injection. FIG. 4 is illustrative only and is not intended to be limiting. In other embodiments, the error signal $V_{ERR}$ is injected at a node separate from the ripple injection node.

Figure 5:
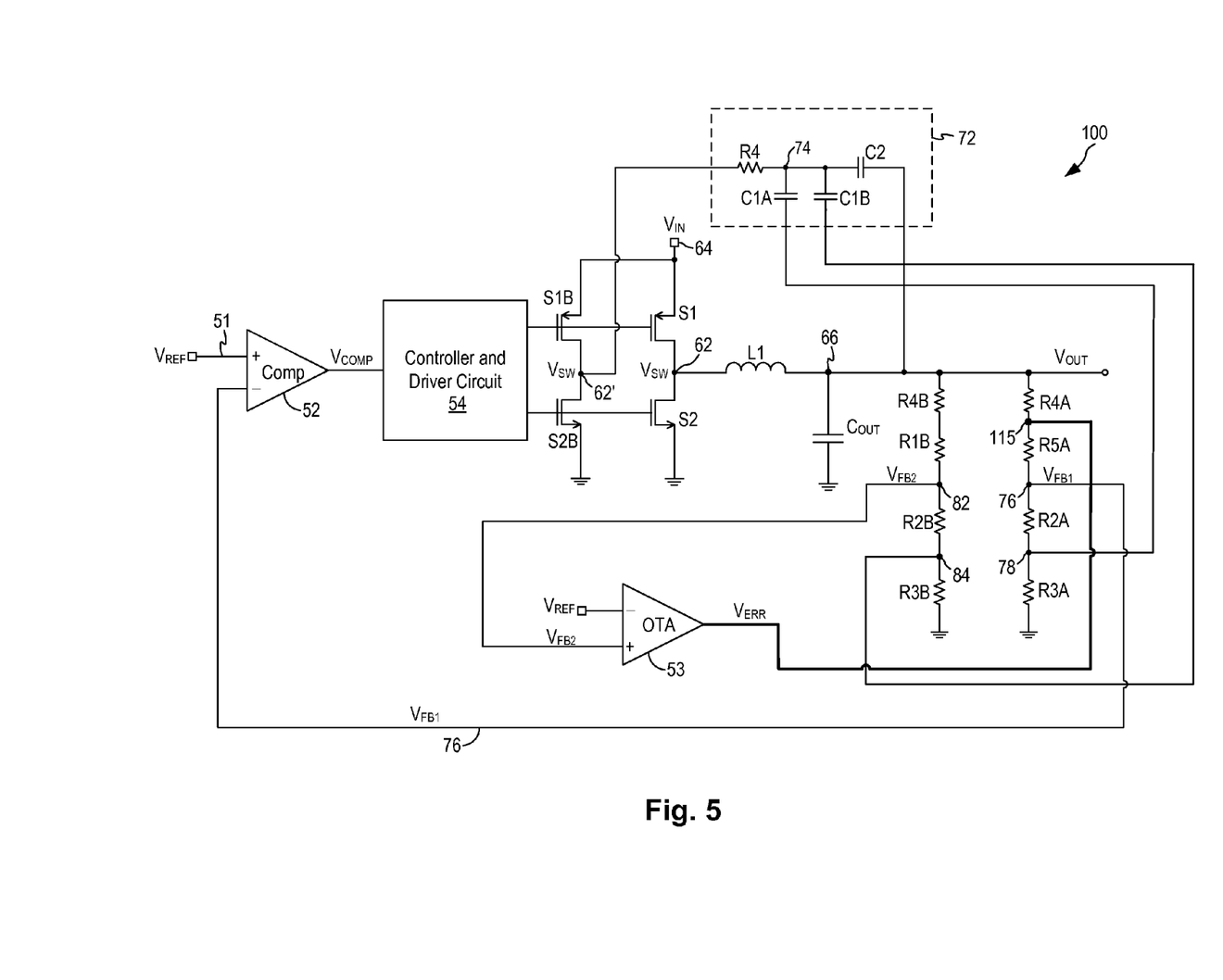
FIG. 5 is a schematic diagram illustrating an alternate embodiment of a buck switching regulator incorporating a balanced feedback network in the feedback control loop.
Figure 6:
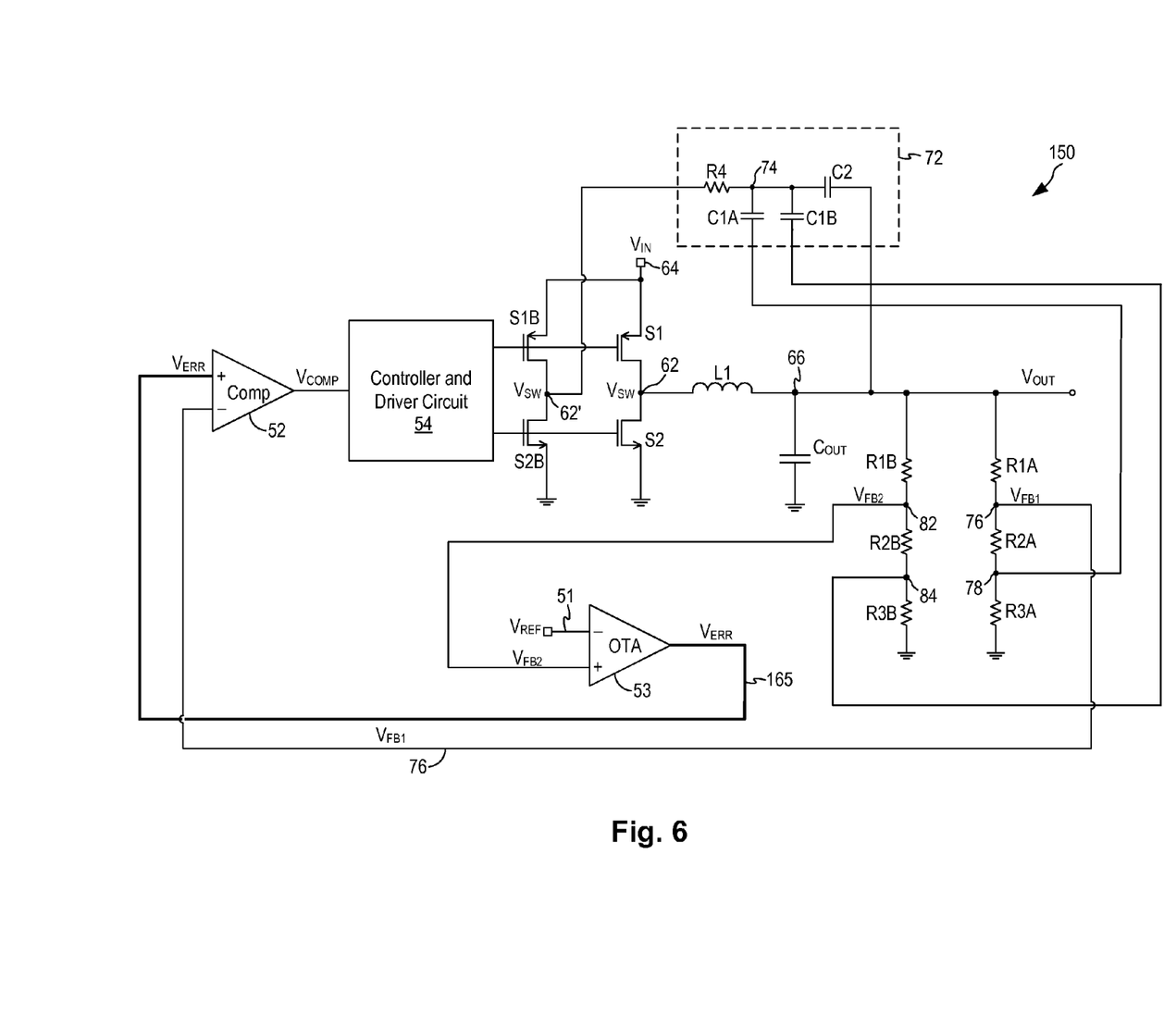
FIG. 6 is a schematic diagram illustrating an alternate embodiment of a buck switching regulator incorporating a balanced feedback network in the feedback control loop.
Figure 7:
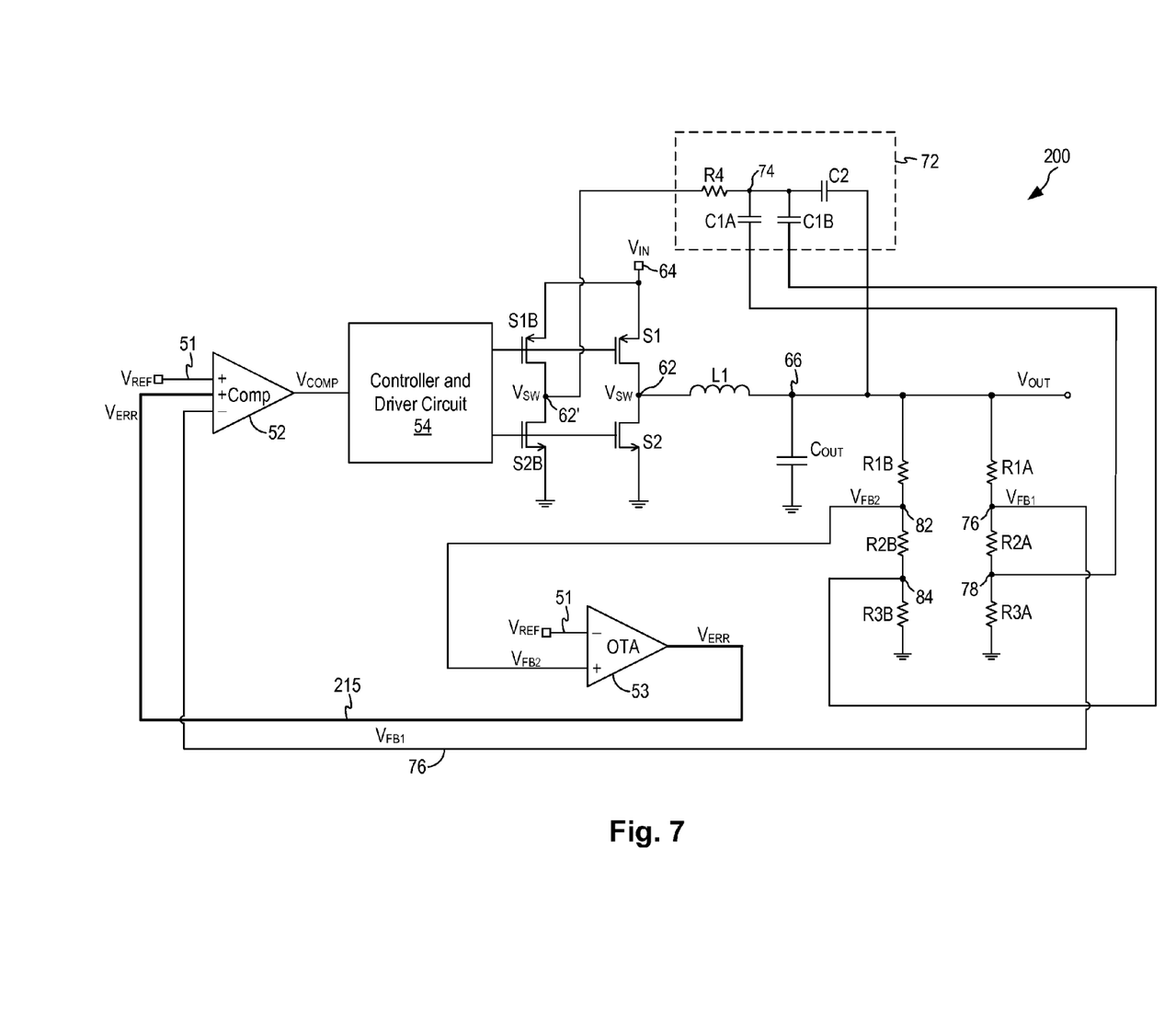
FIG. 7 is a schematic diagram illustrating an alternate embodiment of a buck switching regulator incorporating a balanced feedback network in the feedback control loop.

FIGS. 5-7 illustrate alternate embodiments of a buck switching regulator incorporating a balanced feedback network with the error signal $V_{ERR}$ being injected at different points in the feedback control loop. Like elements in FIGS. 3-7 are given like reference numerals and will not be further described. Referring first to FIG. 5, the error signal $V_{ERR}$ from the OTA 53 is injected at a point of the resistor network above the node 76 (the feedback node) where the first feedback voltage signal is taken. More specifically, resistors R4A and R5A replace resistor R1A in the resistor network. The error signal $V_{ERR}$ is coupled to a node 115 between the resistor R4A and R5A where node 115 is above node 76 in the resistor network, that is, node 115 is further away from the ground potential than node 76. In this case, it is preferable that the resistance of resistor R5A should be less than the sum of the resistance of resistors R2A and R3A. That is, the error signal $V_{ERR}$ can be injected at a node in the feedback network further away from the ground potential than the node where the first feedback voltage is taken as long as the resistance between the error signal injection node and the first feedback voltage node is less than the resistance between the first feedback voltage node and the ground potential.

In both embodiments in FIGS. 4 and 5, the OTA 53 injects the error signal to the resistor network of the first gain circuit. The configurations in FIGS. 4 and 5 are more robust in that the operation of the switching regulator feedback control loop does not depend on the OTA and the OTA merely provides offset error correction. In the event that the OTA does not function, the switching regulator can continue to operate with offset error. In other embodiments, the error signal generated by the OTA using a balanced feedback network can be injected at different points in the feedback control loop.

Referring to FIG. 6, the error signal $V_{ERR}$ (node 165) generated by the OTA using the second feedback voltage signal $V_{FB2}$ is provided to the comparator 52 as the reference signal to be compared with the first feedback voltage signal $V_{FB1}$. Referring to FIG. 7, the error signal $V_{ERR}$ (node 215) generated by the OTA using the second feedback voltage signal $V_{FB2}$ is coupled to the comparator 52 to adjust the comparison level of the comparator 52. In one embodiment, the error signal $V_{ERR}$ is used to adjust the offset level of the comparator 52. The embodiments shown in FIGS. 6 and 7 illustrate alternate ways of using the error signal generated by a balanced feedback network to improve the accuracy of the output voltage of the switching regulator.

In the above description, the feedback network is shown as being constructed as a voltage divider including three or more resistors (e.g., R1A/R2A/R3A). It is instructive to note that the feedback networks shown in FIGS. 3-7 are illustrative only and is not intended to be limiting. In actual implementation, the feedback network may be formed using a resistor string of multiple resistors. The specific arrangement and implementation of the feedback network is not critical to the practice of the present invention. The feedback network of three resistors shown in FIGS. 3-6 represents the equivalent circuit of a resistor string of any number of resistors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A buck switching regulator being configured to receiving an input voltage and to generate a regulated output voltage, the buck switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the buck switching regulator including a feedback control circuit comprising:

a feedback network including first and second gain circuits configured to generate first and second feedback signals, respectively, indicative of the regulated output voltage;

a ripple generation circuit configured to generate a ripple signal using the switching output voltage and to inject the ripple signal to the first gain circuit;

an operational transconductance amplifier (OTA) configured to receive the second feedback signal generated from the second gain circuit and a reference signal and to generate an output signal having a magnitude indicative the difference between the second feedback signal and the reference signal, the output signal of the OTA being coupled to the first gain circuit to adjust the first feedback signal; and a comparator configured to receive the first feedback signal and the reference signal and to generate a comparator output signal having an output level indicative of the difference between the first feedback signal and the reference signal, wherein the output signal of the OTA is applied to the first feedback signal to cancel a voltage offset in the regulated output voltage due to the injected ripple signal at the first gain circuit.

2. The buck switching regulator of claim 1, wherein the OTA has a slow bandwidth and the output signal of the OTA rejects ripple and transient that may be present on the regulated output voltage.

3. The buck switching regulator of claim 1, wherein the first feedback signal has the same magnitude or a different magnitude than the second feedback signal.

4. The buck switching regulator of claim 1, wherein the output signal of the OTA is coupled to a first node in the first gain circuit at a node at which the first feedback signal is generated.

5. The buck switching regulator of claim 1, wherein the output signal of the OTA is coupled to a first node in the first gain circuit below a second node at which the first feedback signal is generated, the first node being closer to the ground potential than the second node.

6. The buck switching regulator of claim 1, wherein the first gain circuit comprises a voltage divider having a first divider ratio and the second gain circuit comprises a voltage divider having a second divider ratio, the first divider ratio being the same as or different from the second divider ratio.

7. The buck switching regulator of claim 6, wherein the first gain circuit comprises:
   first, second and third resistors connected in series between the output node and a ground potential, the first feedback signal being generated at a node between the first and second resistors, and the ripple generation circuit being configured to inject the first ripple signal to a node between the second and third resistors,
   wherein the output signal of the OTA is coupled to the node between the second and third resistors.

8. The buck switching regulator of claim 7, wherein the second gain circuit comprises:
   fourth, fifth and sixth resistors connected in series between the output node and a ground potential, the second feedback signal being generated at a node between the fourth and fifth resistors,
   wherein the OTA receives the second feedback signal and generates the output signal to be coupled to the node between the second and third resistors of the first gain circuit.

9. The buck switching regulator of claim 1, further comprising:
   a controller and driver circuit configured to drive the high-side switch and the low-side switch in response to the comparator output signal, the comparator output signal being asserted to turn on the high-side switch.

10. The buck switching regulator of claim 9, wherein the comparator output signal is asserted when the first feedback signal is less than the reference signal.

11. The buck switching regulator of claim 9, wherein the controller and driver circuit implements a constant on-time feedback control scheme.

12. A method in buck switching regulator receiving an input voltage and controlling a high-side switch and a low-side switch using a feedback control scheme to drive a switch output node for generating a switching output voltage, the switch output node being coupled to an LC filter circuit to generate a regulated output voltage having a substantially constant magnitude on an output node, the method comprising:
   generating first and second feedback signals indicative of the regulated output voltage using first and second feedback networks, respectively;
   generating a ripple signal using the switching output voltage;
   injecting the ripple signal to the first feedback network generating the first feedback signal;
   generating using an operational transconductance amplifier (OTA) an output signal having a magnitude indicative the difference between the second feedback signal and a reference signal;
   coupling the output signal of the OTA to the first gain circuit to adjust the first feedback signal so as to cancel a voltage offset in the regulated output voltage due to the injected ripple signal to the first feedback signal; and
   generating using a comparator a comparator output signal having an output level indicative of the difference between the first feedback signal and the reference signal.

13. The method of claim 12, wherein the OTA has a slow bandwidth and generating using an operational transconductance amplifier (OTA) an output signal having a magnitude indicative the difference between the second feedback signal and a reference signal comprises:
   generating an output signal at the OTA which rejects ripple and transient that may be present on the regulated output voltage.

14. The method of claim 12, wherein the first feedback signal has the same magnitude or a different magnitude than the second feedback signal.

15. The method of claim 12, wherein generating first and second feedback signals indicative of the regulated output voltage using first and second feedback networks comprises:
   dividing the regulated output voltage by a first divider ratio to generate the first feedback signal; and
   dividing the regulated output voltage by a second divider ratio to generate the second feedback signal, the first divider ratio being the same as or different from the second divider ratio.

16. The method of claim 15, wherein dividing the regulated output voltage by a first divider ratio to generate the first feedback signal comprises:
   connecting first, second and third resistors in series between the output node and a ground potential, the first feedback signal being generated at a node between the first and second resistors, and the first ripple signal being injected to a node between the second and third resistors,
   wherein the output signal of the OTA is coupled to the node between the second and third resistors.

17. The method of claim 16, wherein dividing the regulated output voltage by a second divider ratio to generate the second feedback signal comprises:
   connecting fourth, fifth and sixth resistors in series between the output node and a ground potential, the second feedback signal being generated at a node between the fourth and fifth resistors.

18. The method of claim 12, further comprising:
   driving the high-side switch and the low-side switch in response to the comparator output signal, the comparator output signal being asserted to turn on the high-side switch.

19. The method of claim 18, wherein generating using a comparator a comparator output signal having an output level indicative of the difference between the first feedback signal and the reference signal comprises:
   asserting the comparator output signal when the first feedback signal is less than the reference signal.

20. The method of claim 18, wherein driving the high-side switch and the low-side switch in response to the comparator output signal comprises:
   driving the high-side switch and the low-side switch in response to the comparator output signal under a constant on-time feedback control scheme.

* * * * *